United States Patent [19]
Dubois

[11] Patent Number: 5,821,418
[45] Date of Patent: Oct. 13, 1998

[54] COOLED FIXTURE FOR HIGH TEMPERATURE ACCELEROMETER MEASUREMENTS

[75] Inventor: Neil J. Dubois, Cranston, R.I.

[73] Assignee: The United States of America as represented by the Secretary of the Navy, Washington, D.C.

[21] Appl. No.: 641,325

[22] Filed: Apr. 28, 1996

[51] Int. Cl.⁶ .................................................. G01P 1/02
[52] U.S. Cl. .............................................. 73/493; 73/644
[58] Field of Search ........................... 73/650, 514.02, 73/493, 497, 431, 32 A, 708, 756, 1 D, 1 DV, 1.16, 1.37, 1.82, 644

[56] References Cited

U.S. PATENT DOCUMENTS

| | | |
|---|---|---|
| 3,614,487 | 10/1971 | Hatschek .................................. 310/329 |
| 3,742,347 | 6/1973 | Walton .............................. 324/DIG. 1 |
| 3,791,203 | 2/1974 | Rice ........................................... 73/650 |
| 3,863,508 | 2/1975 | Scarborough et al. . |
| 4,175,442 | 11/1979 | Terry ......................................... 73/644 |
| 4,187,720 | 2/1980 | Baker ........................................ 73/702 |
| 4,232,553 | 11/1980 | Benedetto et al. ........................ 73/204 |
| 4,935,883 | 6/1990 | Hulsing, II .............................. 364/559 |
| 5,241,262 | 8/1993 | Guthrie et al. .......................... 324/71.1 |
| 5,353,627 | 10/1994 | Diatschenko ........................... 73/61.43 |
| 5,361,636 | 11/1994 | Farstad ..................................... 73/592 |
| 5,450,753 | 9/1995 | Maynor ..................................... 73/644 |

*Primary Examiner*—Christine K. Oda
*Attorney, Agent, or Firm*—Michael J. McGowan; James M. Kasischke; Prithvi C. Lall

[57] ABSTRACT

The present invention relates to a cooled fixture for high temperature accelerometer measurement. The fixture includes a collar mounted to a pipe and a block mounted to the collar to which one or more accelerometers may be connected. The block is provided with a cooling system for controlling the temperature of the accelerometer(s) mounted to the block and maintaining the temperature at a level at which the accelerometers will survive.

12 Claims, 1 Drawing Sheet

COOLED FIXTURE FOR HIGH TEMPERATURE ACCELEROMETER MEASUREMENTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a device for measuring the acceleration of or vibrations created by a fluid travelling through a conduit such as a high temperature steam pipe.

(2) Description of the Prior Art

Sensors are used for a variety of technical applications for measuring and monitoring purposes. In many applications, the sensors are required to operate in high temperature environments. U.S. Pat. No. 3,791,203 to Rice illustrates a pair of accelerometers, used in a hot environment, for measuring the torsional vibration of a rotating horizontal shaft. One of the problems with the Rice accelerometer arrangement is that there is no provision to cool the accelerometers. As a result, the sensors are subject to heat damage.

U.S. Pat. No. 5,241,262 to Guthrie et al. illustrates a molten metal inclusion sensor for use in the testing of steel. The sensor comprises a probe which is detachably connected to a water-cooled support member. Still another sensor which is provided with cooling is shown in U.S. Pat. No. 3,171,989 to Hatschek. The Hatschek sensor is a pressure sensor for use in internal combustion engines. Cooling is provided by cooling the sensor elements themselves with highly viscous, high heat capacity cooling fluids.

U.S. Pat. No. 3,536,939 to Zeiringer and U.S. Pat. No. 3,614,487 to Hatschek both teach the use of a base plate for an accelerometer which contains open channels cut into a bottom surface. The channels serve two purposes. First, they reduce the area in contact with any hot mounting surface, thereby reducing the heat flux across the interface and into the accelerometer. They also allow for some volume of air to flow therethrough and provide a modicum of free convection cooling to the accelerometer base plate.

The production of high temperature, high pressure steam creates substantial energy and vibration in a steam plant and piping. It is required to quantify the vibration in the steam piping since the steam is being used to drive a propulsion system which will be subjected to noise measurements. The contribution to the overall noise from the steam delivery system is a critical piece of information in the determination of noise contributed by the propulsion system. Unfortunately, steam pipes have temperatures in excess of 1000° F. Accelerometers, even high temperature models, do not have the capacity to perform in regions above about 350° F. Some means is required to make the needed measurement while keeping the accelerometer acceptably cool.

While some of the aforementioned patents show sensors with some form of cooling, none of them show the concept of providing active, forced convection cooling to the media on which the accelerometer is mounted. The inventor has found that such a design is of paramount importance in a device which is designed to measure vibrations of high temperature superheated steam pipes. In such environments, the wall temperatures of the pipe to which the sensor is mounted can be as high as 1200° to 1500° F. Simple air flow across the base plate could not provide the necessary cooling for the sensor. Additionally, one faces the problem that steam pipes must be insulated to prevent condensation of the steam. Thus, any sensor that is mounted to the steam pipe will be surrounded by thermal insulation, which prevents any air flow from occurring in the sensor mounting area.

SUMMARY OF THE INVENTION

Accordingly, it is an object of the present invention to provide an improved device mounted to a steam pipe for measuring the acceleration of or the vibrations caused by a fluid flowing through the pipe.

It is a further object of the present invention to provide a device as above which has an active, forced convection cooling system which allows survival of the sensor.

It is a further object of the present invention to provide a device as above which is easy to install and remove.

The foregoing objects are attained by the device of the present invention.

In accordance with the present invention, a device for measuring the acceleration of or the vibrations created by a fluid, such as high temperature steam, travelling through a conduit or a pipe comprises means for mounting at least one accelerometer to the pipe and means for controlling the temperature of the accelerometer associated with the mounting means. In a preferred embodiment, the mounting means comprises a ring collar which clamps around the pipe and a block joined to the collar. Mounting points for one or more accelerometers are provided at or near a top surface of the block. The temperature control means preferably comprises a passageway in the block through which a cooling media is circulated to keep the top of the block cool.

BRIEF DESCRIPTION OF THE DRAWINGS

Other details of the device of the present invention, as well as other objects and advantages to the invention, will become apparent from the following detailed description and the accompanying drawings wherein like reference numerals depict like elements.

DESCRIPTION OF THE PREFERRED EMBODIMENT(S)

Figure 1:
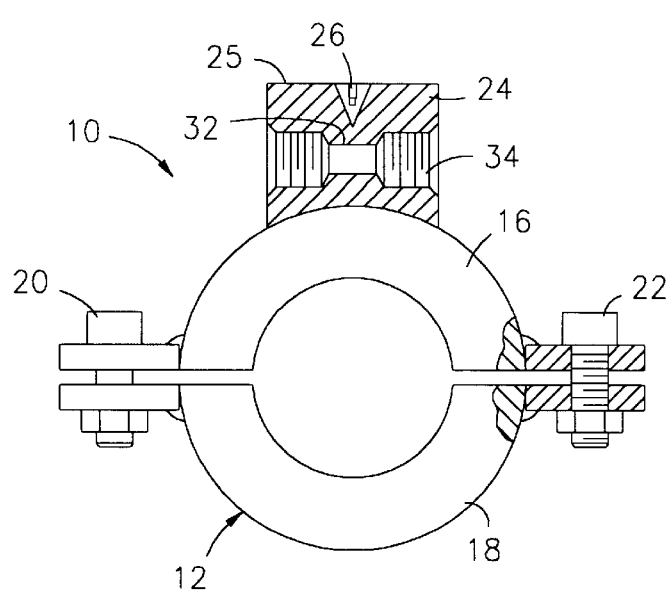
FIG. 1 is a partial sectional view of a high temperature steam pipe to which the device of the present invention has been mounted.
Figure 2:
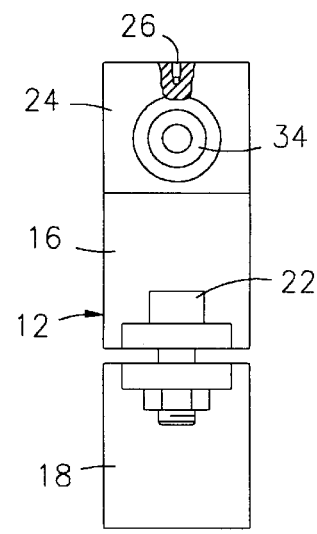
FIG. 2 is a side view of the device of the present invention in partial cross-section.
Figure 3:
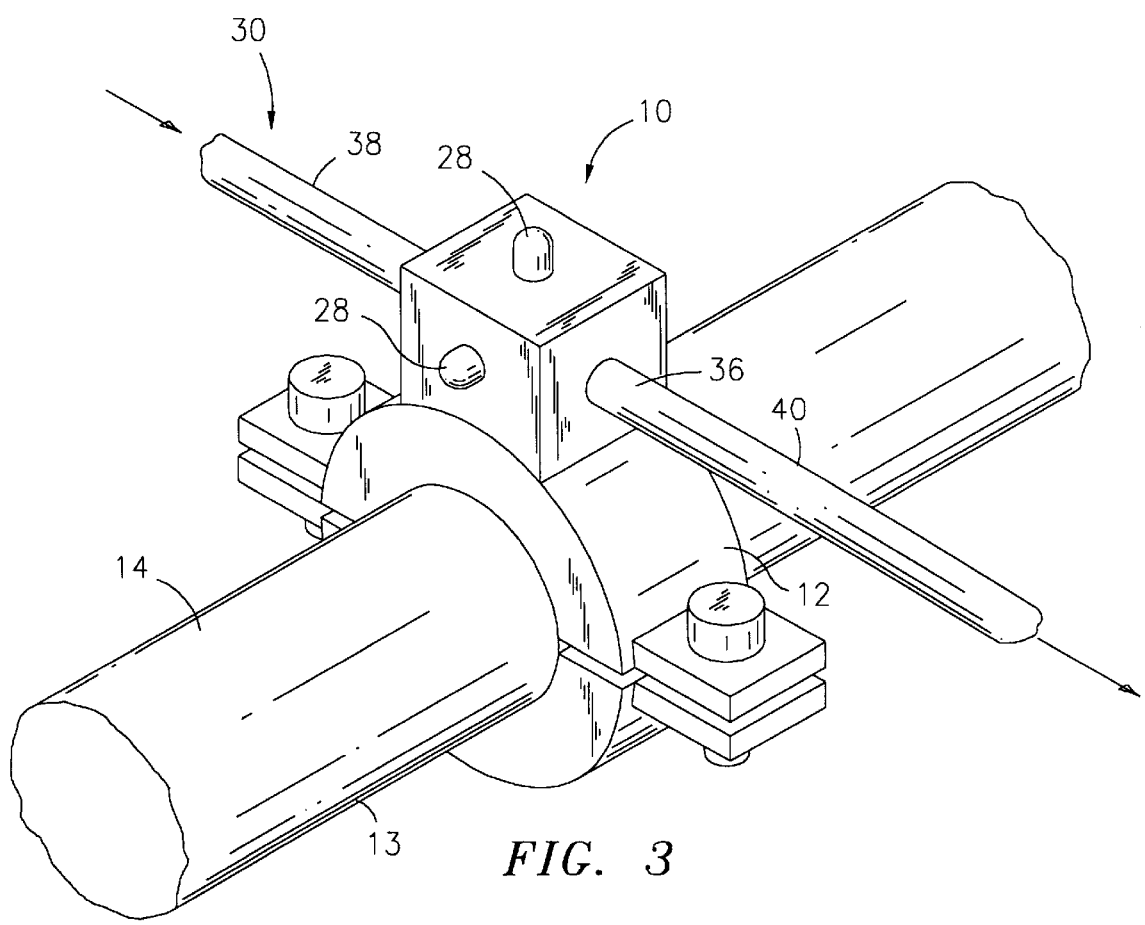
FIG. 3 is a perspective view of the device of the present invention as affixed to a steam pipe.

Referring now to FIGS. 1–3, the device 10 of the present invention includes a ring collar 12 which clamps around a steam pipe 13 or other hot pipe. The outer wall 14 of the pipe 13 may be insulated or uninsulated. As previously discussed, typically the pipe 13 will be insulated. The ring collar 12 has two semi-cylindrical segments 16 and 18 which are connected together by bolt assemblies 20 and 22 in any known manner so as to grab the pipe 13 firmly and thereby not affect the quality of the acceleration or vibration measurement. Bolt assemblies 20 and 22 can be replaced by other fastening devices well known in the art.

A block 24 is welded to one of the segments 16 and 18. Preferably, the block 24 is welded to the top of the uppermost ring segment 16. The block 24 is formed from stainless steel or some other material similar to the material forming the pipe so as to withstand the high temperatures involved.

The block 24 has a plurality of mounting points 26 for attaching one or more accelerometers 28 to the block. The mounting points 26 are preferably threaded bores, although other types of mounting arrangements can be used. The mounting points 26 are spaced about the periphery of the block 24, preferably at or near the top surface 25 of the block 24.

The block 24 is provided with a cooling system 30 to maintain the temperature at a level where accelerometers 28 can survive. The cooling system 30 comprises a passageway 32 machined into the block 24, which passageway terminates in opposed threaded bores 34. A fluid fitting 36 is threaded into each bore 34. One of the fluid fittings 36 is connected to a source (not shown) of cooling fluid via a fluid line 38 and the other fluid fitting 36 is connected to a fluid sump (not shown) via a fluid line 40.

The accelerometer mounting device of the present invention may be used with any suitable accelerometer known in the art for measuring accelerations or vibrations caused by a fluid such as steam flowing through a very high temperature pipe. The device of the present invention allows the accelerometers 28 attached to the device to survive in situations where they would not survive if fastened directly to the pipe 13. The device of the present invention is easy to install and remove. It can be used anywhere there is a free section of pipe to which it can be attached.

While the present invention has been described in the context of mounting accelerometers to a pipe, it should be recognized that the device may be used to mount other types of sensors to a pipe.

It is apparent that there has been provided in accordance with the present invention a cooled fixture for high temperature accelerometer measurements which fully satisfies the means, objects and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A device for mounting at least one accelerometer to a pipe through which a fluid flows comprising:

means for mounting at least one accelerometer to said pipe said mounting means comprising a collar mounted to said pipe and a block attached to said collar, said at least one accelerometer being mounted to said block; and means for controlling the temperature of said at least one accelerometer associated with said mounting means, said temperature controlling means comprises means for placing a cooling fluid in contact with said mounting means so as to transfer heat from said mounting means to said cooling fluid.

2. The device of claim 1 wherein said block is welded to said collar.

3. The device of claim 1 wherein said collar is formed by two semi-cylindrical segments which can be fastened together about said pipe and said block is mounted to one of said semi-cylindrical segments.

4. The device of claim 1 wherein said means for placing cooling fluid in contact with said mounting means comprises passage means extending through said block for allowing a fluid medium to flow through said block.

5. The device of claim 1 wherein said means for placing cooling fluid in contact with said mounting means comprises a passageway machined through said block and a source of cooling fluid communicating with said passageway so that said cooling fluid flows through said block and removes heat from said at least one accelerometer.

6. A device for mounting at least one accelerometer to a pipe through which a fluid flows comprising:

means for mounting at least one accelerometer to said pipe, said mounting means comprising a collar mounted to said pipe and a block attached to said collar; and means for controlling the temperature of said at least one accelerometer associated with said mounting means, said temperature controlling means comprising means for placing a cooling fluid in contact with said mounting means whereby heat is transferred from said mounting means to said cooling fluid;

said block having a surface remote from said pipe and at least one mounting point for said at least one accelerometer, which said mounting point is located substantially near said surface.

7. The device of claim 6 wherein said block has a plurality of mounting points for mounting a plurality of accelerometers, which said mounting points are located substantially adjacent said surface.

8. The device of claim 7 wherein said mounting points are arranged about the periphery of said block.

9. The device of claim 6 wherein said block has at least one side surface having at least one mounting point for said at least one accelerometer.

10. A device for mounting at least one accelerometer to a pipe through which a fluid flows comprising:

means for mounting at least one accelerometer to said pipe, said mounting means comprising a collar mounted to said pipe and a block attached to said collar;

means for controlling the temperature of said at least one accelerometer associated with said mounting means, said temperature controlling means comprising means for placing a cooling fluid in contact with said mounting means whereby heat is transferred from said mounting means to said cooling fluid;

said block having a surface remote from said pipe and at least one mounting point for said at least one accelerometer, which said mounting point is located substantially near said surface; and said at least one mounting point comprising at least one threaded bore into which said at least one accelerometer is threaded.

11. The device of claim 1 wherein said block is made from stainless steel.

12. The device of claim 1 wherein:

said pipe comprises means for transporting a heated fluid; and said at least one accelerometer comprises means for measuring at least one of the acceleration of or the vibrations created by said heated fluid travelling through said pipe.

* * * * *